United States Patent
El-Sallabi

(10) Patent No.: US 8,532,676 B1
(45) Date of Patent: Sep. 10, 2013

(54) ESTIMATING WHETHER A WIRELESS TERMINAL IS INDOORS VERSUS OUTDOORS USING PROBABILITIES AND CLASSIFICATIONS

(75) Inventor: Hassan Mohamed El-Sallabi, Palo Alto, CA (US)

(73) Assignee: Polaris Wireless, Inc., Mountain View, CA (US)

( * ) Notice: Subject to any disclaimer, the term of this patent is extended or adjusted under 35 U.S.C. 154(b) by 0 days.

(21) Appl. No.: 13/478,009

(22) Filed: May 22, 2012

(51) Int. Cl.
*H04W 24/00* (2009.01)
*H04M 11/04* (2006.01)
*H04B 17/00* (2006.01)

(52) U.S. Cl.
USPC ............... 455/456.5; 455/404.2; 455/67.11

(58) Field of Classification Search
USPC .......... 455/67.11, 404.2, 456.1, 456.2, 456.3, 455/456.5, 456.6
See application file for complete search history.

(56) References Cited

U.S. PATENT DOCUMENTS

| | | | |
|---|---|---|---|
| 6,249,680 B1 * | 6/2001 | Wax et al. ................ | 455/456.2 |
| 7,149,499 B1 * | 12/2006 | Oran et al. ................ | 455/404.2 |
| 7,203,497 B2 * | 4/2007 | Belcea ........................ | 455/446 |
| 7,664,511 B2 * | 2/2010 | Wang et al. ............... | 455/456.1 |
| 8,264,402 B2 * | 9/2012 | Kaiser et al. .............. | 342/174 |
| 8,385,943 B1 * | 2/2013 | Han et al. .................. | 455/456.1 |
| 2002/0132625 A1 * | 9/2002 | Ogino et al. ............... | 455/456 |
| 2003/0143994 A1 * | 7/2003 | Kimura et al. ............. | 455/422 |
| 2005/0143091 A1 * | 6/2005 | Shapira et al. ............ | 455/456.1 |
| 2005/0176441 A1 * | 8/2005 | Jurecka ....................... | 455/456.1 |
| 2006/0019679 A1 * | 1/2006 | Rappaport et al. ........ | 455/456.5 |
| 2006/0025158 A1 * | 2/2006 | Leblanc et al. ............ | 455/456.2 |
| 2006/0089153 A1 * | 4/2006 | Sheynblat .................. | 455/456.1 |
| 2007/0099629 A1 * | 5/2007 | Twitchell, Jr. ............. | 455/456.1 |
| 2007/0178911 A1 * | 8/2007 | Baumeister et al. ....... | 455/456.1 |
| 2007/0287473 A1 * | 12/2007 | Dupray ...................... | 455/456.1 |
| 2008/0026770 A1 * | 1/2008 | Rudravaram et al. ...... | 455/456.1 |
| 2009/0149200 A1 * | 6/2009 | Jayasinghe et al. ........ | 455/456.3 |
| 2009/0252138 A1 * | 10/2009 | Alizadeh-Shabdiz et al. ............................. | 370/338 |
| 2009/0280829 A1 * | 11/2009 | Feuerstein ................. | 455/456.1 |
| 2009/0312037 A1 * | 12/2009 | Jo et al. ..................... | 455/456.2 |
| 2010/0144367 A1 * | 6/2010 | Goh et al. .................. | 455/456.1 |
| 2011/0081918 A1 * | 4/2011 | Burdo et al. ............... | 455/456.1 |
| 2011/0267492 A1 * | 11/2011 | Prentice et al. ............ | 348/223.1 |
| 2011/0298658 A1 * | 12/2011 | Riley et al. ................ | 342/357.26 |
| 2012/0028649 A1 * | 2/2012 | Gupta et al. ............... | 455/456.1 |
| 2012/0083241 A1 * | 4/2012 | Annamalai et al. ........ | 455/404.2 |
| 2012/0184286 A1 * | 7/2012 | Richardson et al. ....... | 455/456.1 |
| 2012/0184295 A1 * | 7/2012 | Mitsuya et al. ............ | 455/456.1 |
| 2012/0309410 A1 * | 12/2012 | Marti et al. ................ | 455/456.1 |
| 2012/0315918 A1 * | 12/2012 | Kadous ...................... | 455/456.1 |
| 2013/0035110 A1 * | 2/2013 | Sridhara et al. ............ | 455/456.1 |
| 2013/0053056 A1 * | 2/2013 | Aggarwal et al. .......... | 455/456.1 |

* cited by examiner

*Primary Examiner* — Christopher M Brandt
(74) *Attorney, Agent, or Firm* — Kaplan Breyer Schwarz & Ottesen, LLP

(57) ABSTRACT

Methods for generating more accurate location estimates are based on indicative factors. The factors are gleaned from wireless signals that were received by a wireless terminal and from other network-specific data. Each factor is probative of whether the wireless signals were received by the wireless terminal: (i) indoors versus outdoors, and/or (ii) "above-the-clutter" versus "below-the-clutter" of ambient wireless signals, and/or (iii) while moving at a certain speed classification, e.g., stationary/pedestrian versus vehicular speeds. Each factor tends to prove or disprove the particular characteristic. The result is an estimated probability, such as the probability that the wireless terminal received the signals indoors. The estimated probability is applied to the analysis of candidate locations, eliminating some candidates from further consideration. This enables computational resources to focus on the remaining higher-likelihood candidate locations and provides improved accuracy in the location estimate.

20 Claims, 7 Drawing Sheets

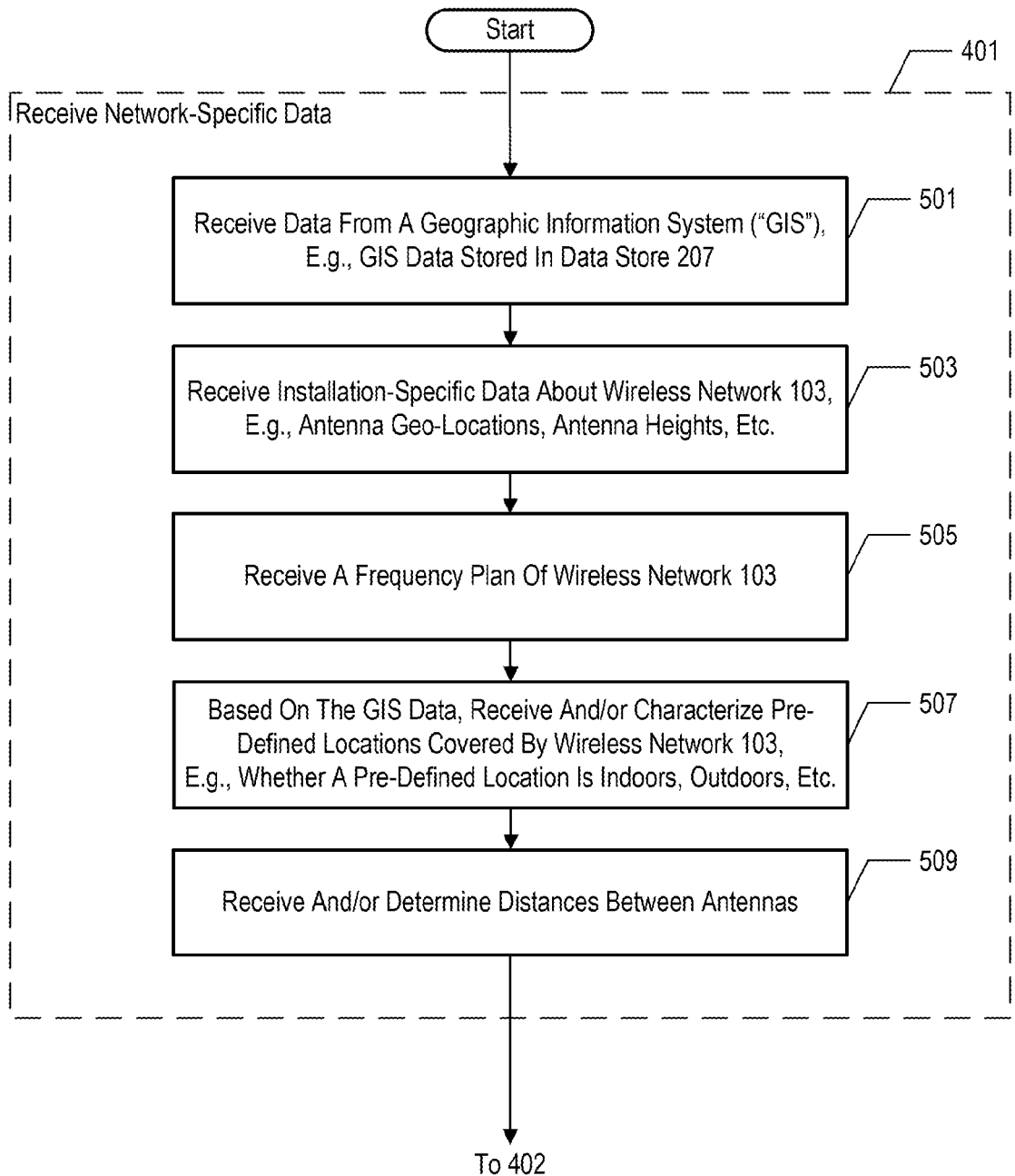

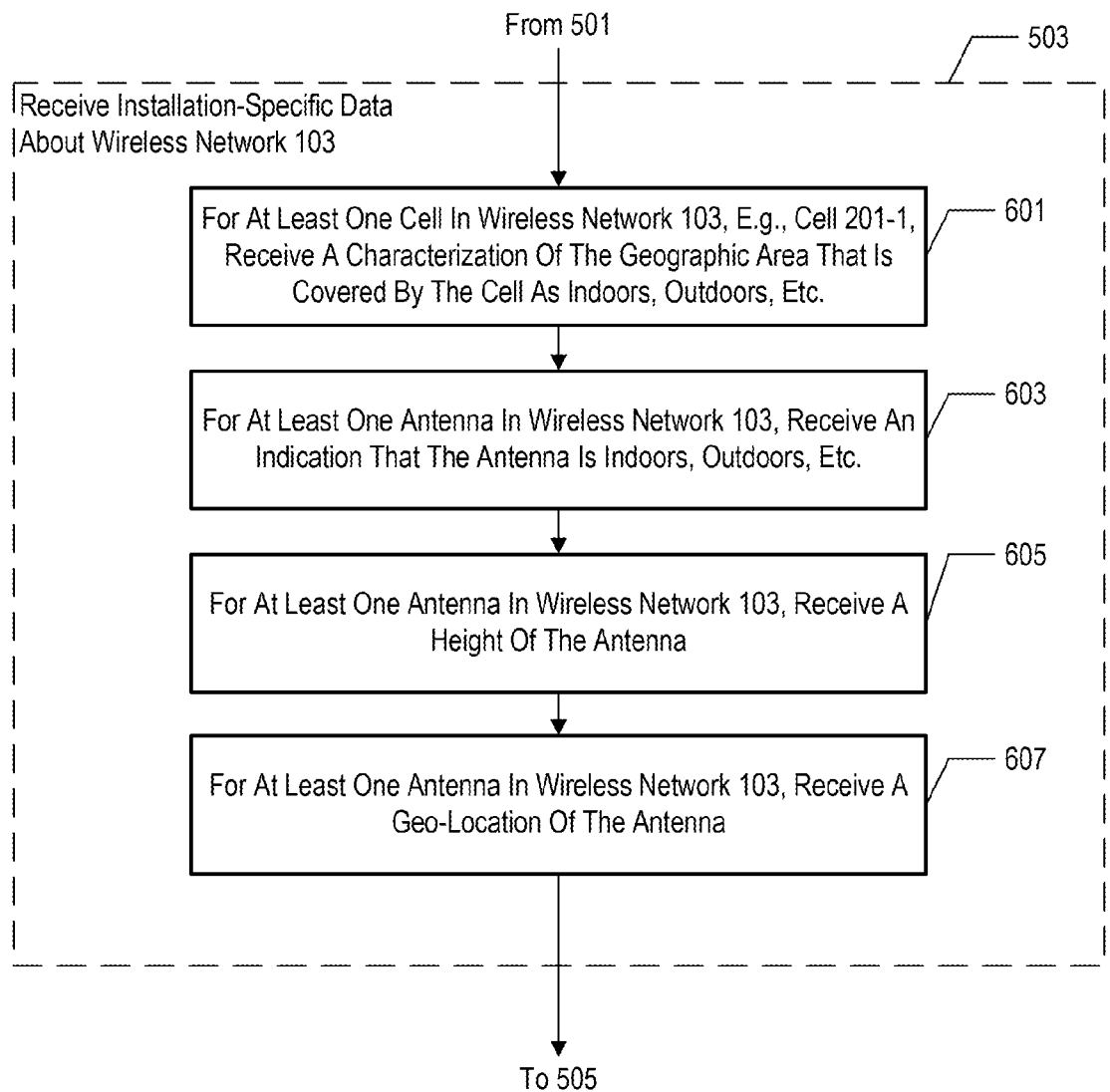

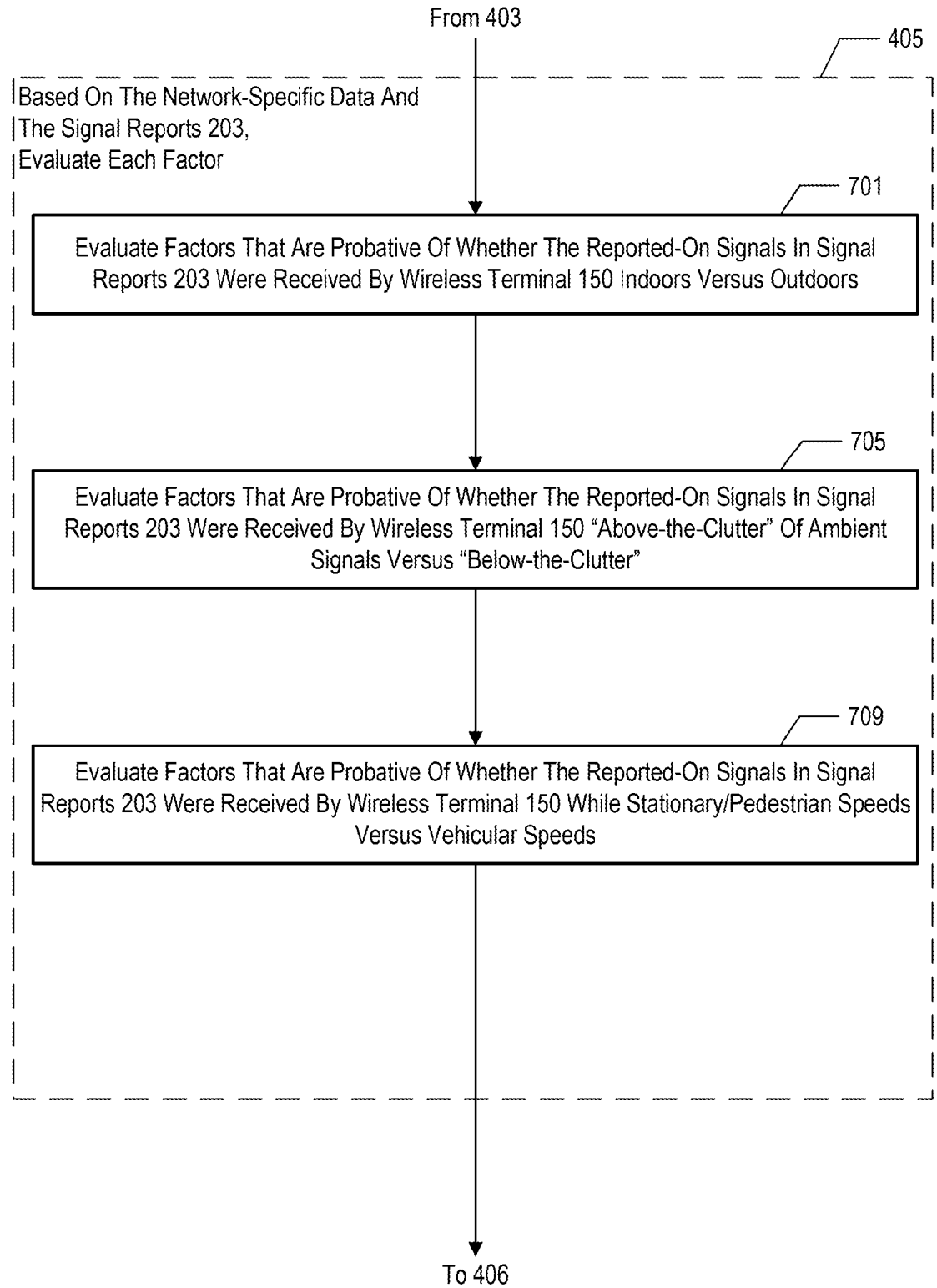

ESTIMATING WHETHER A WIRELESS TERMINAL IS INDOORS VERSUS OUTDOORS USING PROBABILITIES AND CLASSIFICATIONS

FIELD OF THE INVENTION

The present invention relates to wireless networks in general, and, more particularly, to systems and methods for estimating whether a wireless telecommunications terminal is located indoors versus outdoors.

BACKGROUND OF THE INVENTION

Location determination systems are used in the prior art to identify one or more locations where a given wireless terminal may be found when responding to an emergency (911) call, or in tracking a suspect or a missing person, etc. It is well known in the art that the signal strength of a wireless signal received from a transmitter differs among locations, and, therefore, the location of a wireless terminal can be estimated by comparing the signal strength it currently experiences against a map or database that correlates locations to signal strengths. For example, if a particular radio station is known to transmit a strong signal to a first location and a weak signal to a second location, and a given wireless terminal at an unknown location is receiving the radio station with a weak signal, it is more likely that the wireless terminal is at the second location than it is at the first location.

In regard to wireless networks, a wireless terminal generally receives wireless signals from several antennas in the network. The received signals vary in signal strength with respect to each antenna, and vary further as the wireless terminal moves from location to location. This variability provides a kind of pattern that is indicative of the location where the wireless terminal received the signals. A simplified example illustrates this point. A first antenna, Antenna A, transmits a strong signal to Location 1 and Location 2, but a weak signal to Location 3, Location 4, and Location 5; and a second antenna, Antenna B, transmits a strong signal to Location 1, Location 3 and Location 5, but a weak signal to Location 2 and Location 4. This information is summarized in Table 1 below and forms the basis for a map or database that correlates locations to signal strength.

TABLE 1

Illustrative Signal Strength Database (Absolute Signal Strength)

|  | Antenna A | Antenna B |
| --- | --- | --- |
| Location 1 | Strong Signal | Strong Signal |
| Location 2 | Strong Signal | Weak Signal |
| Location 3 | Weak Signal | Strong Signal |
| Location 4 | Weak Signal | Weak Signal |
| Location 5 | Weak Signal | Strong Signal |

If a given wireless terminal at an unknown location receives Antenna A with a weak signal and Antenna B with a strong signal, it is more likely that the wireless terminal is at Location 3 or Location 5 than at any of Locations 1, 2, or 4.

The location analysis does not necessarily end here. After Location 3 and Location 5 have been identified as candidate locations, further analysis is required to resolve—if possible—which of the two locations to report as the estimated location of the wireless terminal. It is important to report speedily and accurately, especially when time is of the essence, for instance in responding to an emergency (911) call, in tracking a suspected criminal/terrorist, in tracking a missing person, etc. However, the prior art techniques are insufficient to help choose between Location 3 and Location 5. A new approach is needed.

SUMMARY OF THE INVENTION

The present inventor recognized a number of tell-tale indicators that, when properly exploited, can produce a faster and more accurate location estimate. In particular regard to pattern matching techniques that analyze signal strengths as received at a wireless terminal, the tell-tale indicators can dramatically reduce the number of candidate locations to be evaluated in the pattern matching analysis. Accordingly, the present inventor devised a number of "factors," each one of which is based on one or more tell-tale indicators. The factors are gleaned primarily from the wireless signals that were received by the wireless terminal and from other network-specific data obtained by the illustrative location estimation system according to the present invention. Each factor is probative of whether the wireless signals were received by the wireless terminal:
 (i) indoors versus outdoors, and/or
 (ii) "above-the-clutter" versus "below-the-clutter" of ambient wireless signals, and/or
 (iii) while moving at a certain speed classification, e.g., stationary/pedestrian versus vehicular speeds.

Each factor tends to prove or disprove the particular location-related characteristic. The result is an estimated probability figure, such as the probability that the wireless terminal received the signals indoors. Alternatively, the result is a more categorical classification, e.g., "the wireless terminal received the signals indoors," or "the wireless terminal received the signals outdoors."

The estimated probability or classification is applied to the candidate locations to eliminate, or otherwise disqualify or under-qualify, inappropriate candidates from further location analysis. This enables scarce computational resources to focus on the remaining higher-likelihood candidate locations. Continuing the example presented above in the Background of the Invention wherein two candidate locations emerged—Location 3 and Location 5—the issue is how to select one candidate over the other. We will use one of the illustrative factors in conjunction with additional network-specific data to select one of the two candidates as the estimated location.

First, the illustrative factor. A factor that is probative of whether the wireless terminal received the signals indoors versus outdoors is based on the number of neighbor cells corresponding to the received signals, and, more specifically, the illustrative factor is defined as the number of neighbor cells corresponding to the received signals averaged over the receiving period of time. According to the illustrative embodiment, when a wireless terminal "sees" only a relatively small number of cells among the received signals, this indicates that the wireless terminal is probably indoors, where signal attenuation is typically greater than outdoors. Notably, the number of neighbor cells does not guarantee—but tends to prove—the inference of "indoors" reception of the wireless signals. In our example, the illustrative factor indicates a small average number of cells among the signals received by the wireless terminal.

Next, the probability. The illustrative embodiment next generates an estimated probability that the wireless terminal was located indoors when it received the wireless signals. The probability is based on the value of the illustrative factor and on relevant network-specific data (e.g., a weight element that is disclosed in more detail below, a threshold figure based on representative network-specific data, etc.). Illustratively, the probability that the wireless terminal was indoors is estimated at 90%.

In our example, we have additional database(s) that pertain to candidate locations 3 and 5. Candidate location 3 is mapped as a park and inferentially characterized as an outdoors location. Candidate location 5 is mapped to a high-rise building and inferentially characterized as an indoor location.

The probability is applied to Location 3 and Location 5. Because Location 3 is characterized as outdoors, the probability of 90% indoors will tend to eliminate Location 3 from further location analysis. On the other hand, because location 5 is characterized as indoors, the probability of 90% indoors will tend to retain Location 5 as a viable candidate. In this simple example, we have only two candidates, and we can confidently select Location 5 as the likely location estimate for the wireless terminal. Location 3 has been filtered out and will consume no further time and computing resources. This was made possible by the factor analysis and by the network-specific data obtained by the location system according to the illustrative embodiment. Notably, the prior art does not consider the factors that are disclosed herein in filtering out candidate locations. To the contrary, the prior art evaluates candidate locations on an equal footing—according to other criteria—regardless of whether they can be characterized as indoors versus outdoors; above-the-clutter versus below-the-clutter; or stationary/pedestrian versus vehicular speeds.

According to an illustrative embodiment of the present invention, candidate locations that are known to be outdoors are eliminated from further consideration in estimating the location of the wireless terminal when a probability that the signals were received indoors results from one or more factors of the received signals—and rises above a given threshold or level of confidence. Similarly, candidate locations that are known to be at ground floor or street level can be eliminated from further consideration in the location analysis when a probability that the signals were received "above-the-clutter" of ambient wireless signals results from one or more factors of the received signals and rises above a certain threshold and/or level of confidence. Similarly, when a probability that the signals were received while the wireless terminal was moving at vehicular speeds results from one or more factors of the received signals (and rises above a threshold), candidate locations that are known to be indoors can be eliminated, because it is unlikely that vehicular speeds can be maintained indoors. The retained candidate locations are more likely to be the correct location of the wireless terminal.

Illustrative factors that are probative of whether the reported-on signals were received by a wireless terminal indoors versus outdoors are described in more detail in the Detailed Description. Examples include without limitation:
(i) (a) a measure of the reported-on signal strengths received by the wireless terminal from a first cell relative to (b) the measure of the reported-on signal strengths received by the wireless terminal from a second cell, and/or
(ii) the number of neighbor cells corresponding to the reported-on signals, etc.

Illustrative factors that are probative of whether the reported-on signals were received by a wireless terminal "above-the-clutter" of ambient wireless signals versus "below-the-clutter" are described in more detail in the Detailed Description. Examples include without limitation:
(i) a measure of the signal strengths of the reported-on signals, and/or
(ii) (a) a measure of the signal strengths of the reported-on signals relative to (b) at least one of (A) the measure of signal strengths characterized as above-the-clutter in the wireless network and (B) the measure of signal strengths characterized as below-the-clutter in the wireless network, etc.

Illustrative factors that are probative of whether the reported-on signals were received by a wireless terminal at a pre-defined classification of speed are described in more detail in the Detailed Description. Examples include without limitation:
(i) whether the identity of the serving cell changed during the reported-on period of time; and/or
(ii) a change in a measure of the reported-on signal strengths relative to the period of time, e.g., a substantial change in mean received signal strength.

In addition to defining the probative factors, the present inventor further appreciated that each factor may contribute more or less to the estimated probability depending on how the particular wireless network is configured, how it is operated, and what kind of geographic terrain it covers. In other words, the contribution of each factor depends to some extent on network-specific data. Network-specific data includes, without limitation: geographic information, a frequency plan, antenna geo-locations, antenna heights, etc. The illustrative embodiment applies machine learning techniques to identify, based on network-specific data, the extent of contribution made by each factor in the given network, and assigns a corresponding weight to each factor. Thus, in generating the estimated probability, each factor is considered according to its network-specific weight based on network-specific data. Moreover, the weight varies according to that factor's contribution to the particular characterization, e.g., indoors versus outdoors contribution resulting in a first weight for a given factor, and "above-the-clutter" versus "below-the-clutter" resulting in a second (and possibly different) weight for that same factor.

It should be noted that in a preferred embodiment, the plurality of factors (and their corresponding network-specific weight(s)) are applied collectively to arrive at a joint probability that is directed to a particular characterization, e.g., the probability that wireless signals were received indoors. Thus, the estimated probability represents a collective assessment characterizing the terminal's location. The collective assessment, based on a plurality of factors rather than a factor-by-factor analysis, has been empirically shown by the inventor to provide increased accuracy in eliminating poor candidate locations and in estimating the location of the wireless terminal. In generating the joint probability or classification according to the illustrative embodiment, the recited system produces a more powerful assessment of the collective effect of these individual factors. In other words, a major advantage accruing to the illustrative embodiment is in analyzing the collective effect of several factors, based on their corresponding network-specific weights, to ultimately arrive at a higher quality estimate of the terminal's location.

An illustrative method that is associated with a wireless network comprises:
receiving, by a data-processing system, reports on the signal strengths of wireless signals received by a wireless terminal from a plurality of antennas in the wireless network;
evaluating, by the data-processing system, a factor that is based on the reports, wherein the factor is probative of whether the reported-on signals were received indoors by the wireless terminal;
generating, by the data-processing system, based on the factor, an estimated probability that the reported-on signals were received indoors by the wireless terminal; and generating, based on the probability, an estimated first location for the wireless terminal, thereby eliminating a second location also based on the probability.

BRIEF DESCRIPTION OF THE DRAWINGS

FIG. 5 depicts a flowchart depicting the salient operations of illustrative operation 401 according to the illustrative embodiment of the present invention.

FIG. 6 depicts a flowchart depicting the salient operations of illustrative operation 503 according to the illustrative embodiment of the present invention.

FIG. 7 depicts a flowchart depicting a salient sub-operation of illustrative operation 405 according to the illustrative embodiment of the present invention.

DETAILED DESCRIPTION

For the purposes of this specification, the following terms and their inflected forms are defined as follows:

The term "location" is defined as a zero-dimensional point, a one-dimensional line, a two-dimensional area, or a three-dimensional volume. Thus, a location can be described by a street address, or geographic coordinates, or by a perimeter, or any combination thereof, without limitation.

The term "wireless terminal" is referred to herein synonymously as "wireless telecommunications terminal" or "mobile phone" or "mobile unit" or "wireless user endpoint" or "wireless user equipment." A wireless terminal is defined as any type of wireless terminal, such as a cellular telephone (e.g., GSM, UMTS, CDMA, TDMA, 3GPP, etc.), smartphone (e.g., iPhone, Android, Blackberry, etc.), mobile tablet (e.g., iTouch, Kindle Fire, iPad, etc.), or a combination thereof, or another mobile unit served by a wireless network.

The term "factor" is associated with reported-on wireless signals that are received by a wireless terminal. A factor is defined, for purposes of the present disclosure, as an attribute that describes one or more aspects of the signal strengths experienced by a wireless terminal, e.g., the number of cells corresponding to the wireless signals received by a wireless terminal. When a factor is evaluated, the values of the factor can be real-valued numbers or categorical values, such as "yes" or "no" or "high" or "greater than" and so on without limitation. A factor is probative of certain relevant characteristics that pertain to the location of the wireless terminal that received the reported-on signals. For example, a factor is probative of whether the wireless terminal received the reported-on signals indoors versus outdoors.

The term "speed classification" is defined as an indicator of the nature of the speed of movement of the wireless terminal while receiving the reported-on wireless signals. Thus, an illustrative binary speed classification is whether the wireless terminal was moving at pedestrian speeds versus vehicular speeds.

Figure 1:
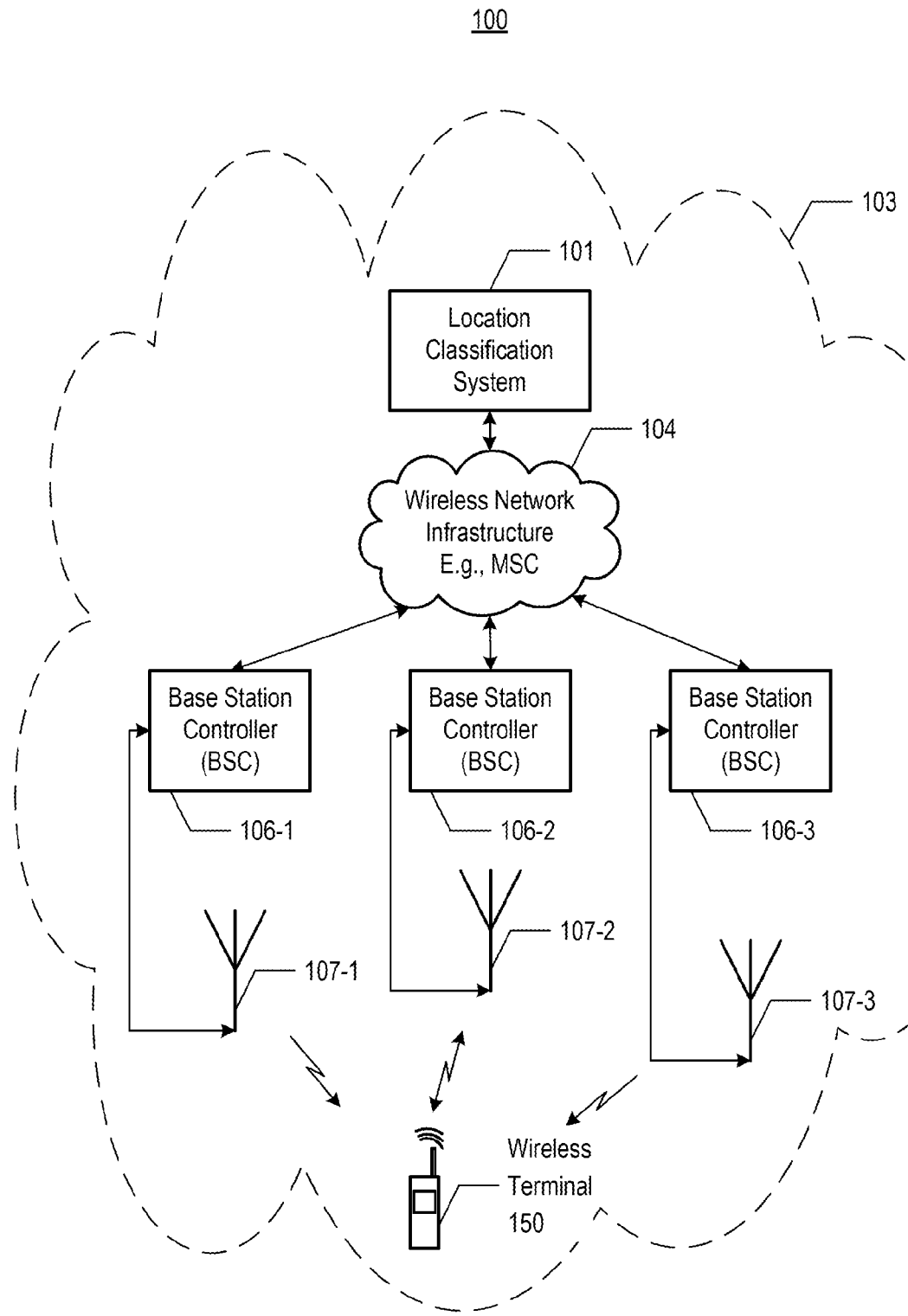
FIG. 1 depicts a schematic diagram of the salient elements of location classification system 100 according to the illustrative embodiment of the present invention.

FIG. 1 depicts a schematic diagram of the salient elements of wireless telecommunications system 100 in accordance with the illustrative embodiment of the present invention. Wireless telecommunications system 100 comprises: location classification system 101; wireless network 103; wireless network infrastructure 104, base station controllers 106, e.g., 106-1, 106-2, and 106-3; base stations 107, e.g., 107-1, 107-2, and 107-3; and wireless telecommunications terminal 150. The illustrative embodiment provides wireless telecommunications service to all of the wireless terminals served by wireless network 103 in well-known fashion, and additionally, location classification system 101 generates the estimated probabilities (and/or classifications), eliminates certain candidates from further consideration, and generates location estimate(s) as described in further detail below.

Figure 4:
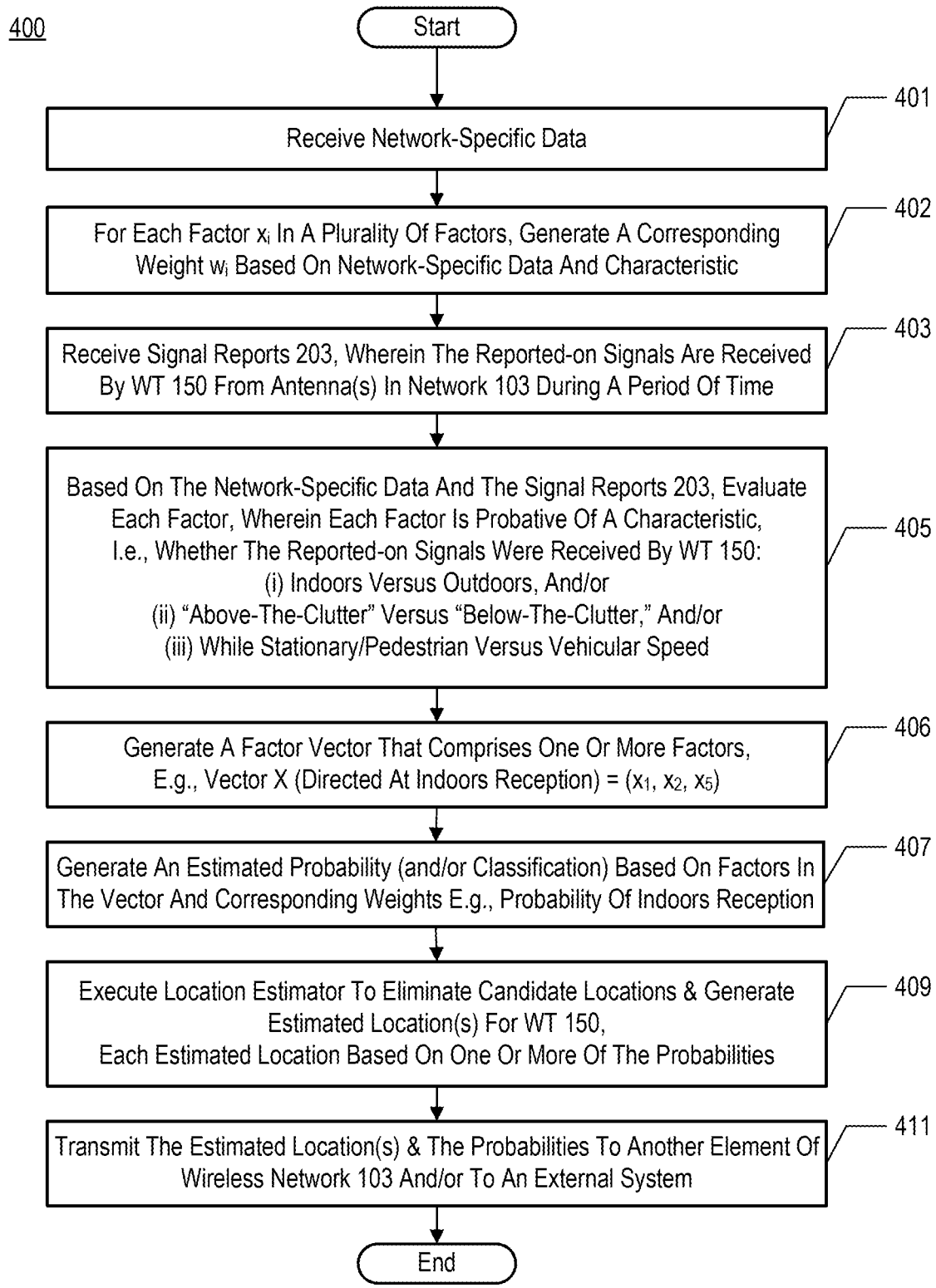
FIG. 4 depicts a flowchart depicting the salient operations of illustrative method 400 according to the illustrative embodiment of the present invention.

Location classification system 101 executes and coordinates the operations described herein, including method 400 depicted in FIG. 4. Location classification system 101 operates on a data-processing system platform that comprises the hardware, the specialized software, and the interconnectivity, as well as the accompanying processing and data communications capabilities that execute the operations described herein, including method 400. Location classification system 101 is described in more detail below and in the accompanying figures.

It will be clear to those having ordinary skill in the art, after reading the present disclosure, how to make and use alternative embodiments in which location classification system 101 operates outside wireless network 103, while maintaining connectivity with network infrastructure 104 and/or other elements of wireless network 103.

Wireless network 103 as illustrated in FIG. 1 is a wireless network that operates according to the Global System for Mobile Communications ("GSM") standards. Therefore, for ease of understanding, the terminology herein is often GSM-specific. It will be clear to those having ordinary skill in the art, after reading the present disclosure, how to make and use alternative embodiments of location classification system 100 in which wireless network 103 is not a GSM network, but is a Universal Mobile Telecommunications System ("UMTS") network; or is based on the 3rd generation Partnership Project ("3GPP") family of standards; or is a Code Division Multiple Access ("CDMA") network; or is a Time Division Multiple Access ("TDMA") network. It will be clear to those having ordinary skill in the art what the appropriate terms and network elements are for non-GSM networks.

Wireless network infrastructure 104 comprises all the elements of wireless network 103 that are well-known in the art and are not individually depicted in the present figure, such as wireless switching centers, mobile switching centers ("MSC"), GPRS service nodes, home location registers, etc. Notably, those elements that support and are particularly associated with location classification system 101 in the context of the present invention are described in further detail in FIG. 2 and below.

Base station controllers ("BSC") 106, illustrated in the present figure by base station controllers 106-1, 106-2, and 106-3, are well known elements of wireless network 103. BSC 106 is responsible for signaling between a wireless telecommunications terminal and the main wireless switching elements of the network such as mobile switching centers and/or GPRS serving nodes. Typically, each BSC 106 controls a plurality of base stations 107, but for the sake of simplicity, only one base station 107 is illustrated here per BSC 106.

Base stations 107, illustrated in the present figure as base stations 107-1, 107-2, and 107-3 and connected to base station controllers 106-1, 106-2, and 106-3, respectively, are all well known in the art. A base station 107 is responsible for the radio frequency ("RF") communication link to/from wireless telecommunications terminals. Typically, each base station has a plurality of directional antennas, as shown diagrammatically in the present figure. Each antenna transmits RF signals and receives RF signals, i.e., wireless signals, to/from a plurality of wireless terminals. Base stations 107 and the constituent antennas and the corresponding wireless signals are well known in the art.

It will be clear to those having ordinary skill in the art, after reading the present disclosure, how to make and use location classification system 101 using multiple-input and multiple-output ("MIMO") technology in regard to the base stations and their respective controllers. In other words, the systems and methods disclosed herein are agnostic of the particular underlying radio transmission architecture employed in the wireless network, as will be clear after reading the present disclosure. MIMO is well known in the art.

Wireless terminal 150 is illustratively a GSM cellular telephone. It will be clear to those having ordinary skill in the art, after reading the present disclosure, how to make and use alternative embodiments of the present invention in which wireless terminal 150 is another type of well known wireless terminal, as defined above. As depicted here, wireless terminal 150 receives radio-frequency ("RF") wireless signals from base stations 107-1, 107-2, and 107-3; wireless terminal 150 has an active two-way communication link with only one base station—base station 107-2 (as described in more detail in regard to FIG. 2). As is well known in the art, wireless terminal 150 "sees" beacon signals from one or more antennas of each of the several base stations 107. What is important to know for purposes of the present invention is that wireless terminal 150 receives a plurality of wireless signals from a plurality of antennas, each signal having a signal strength as received by the wireless terminal. This is discussed in more detail below and with respect to FIG. 2.

Figure 2:
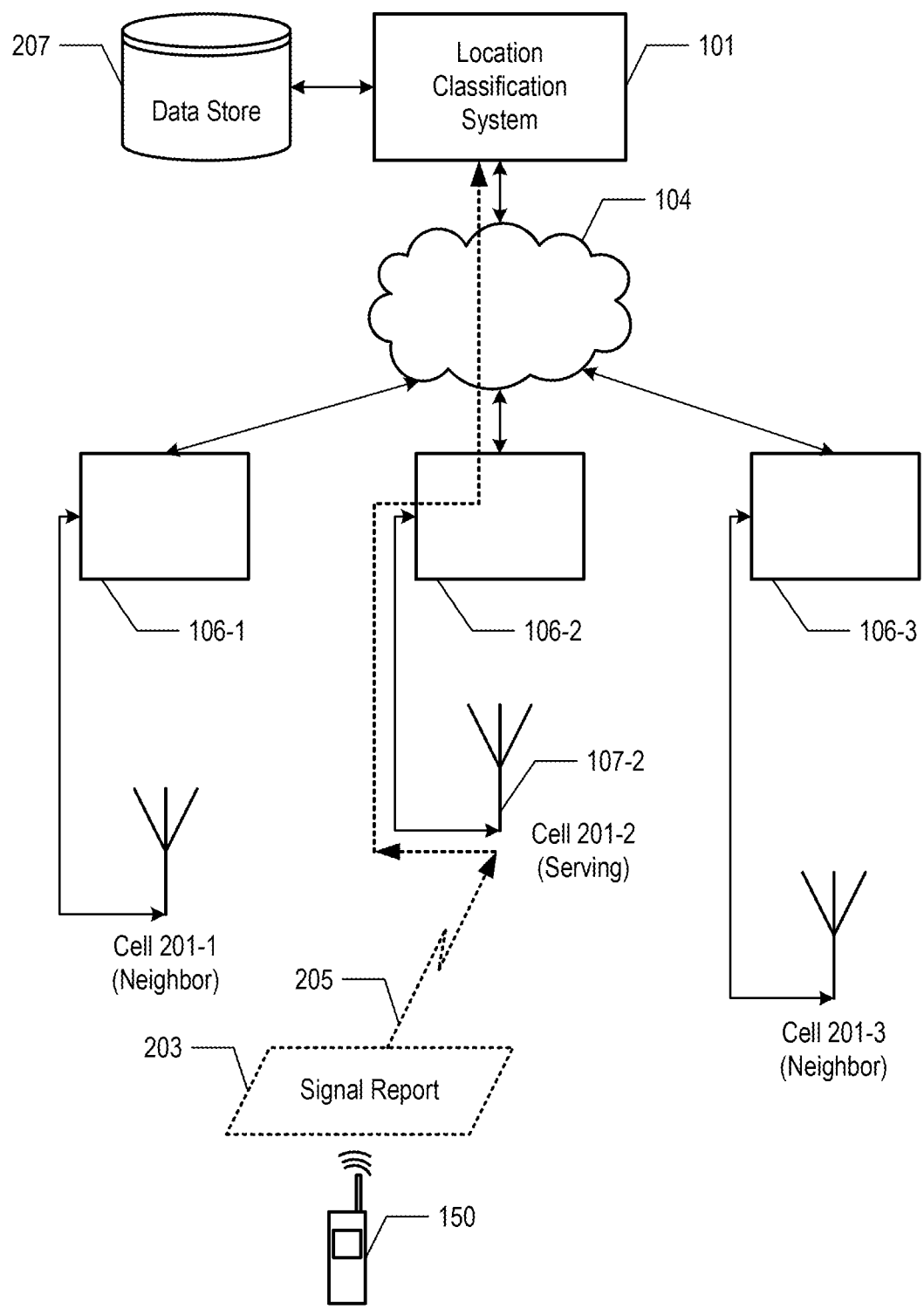
FIG. 2 depicts an illustrative message flow from a wireless telecommunications terminal to location classification system 101 according to the illustrative embodiment of the present invention.

FIG. 2 depicts an illustrative message flow from a wireless telecommunications terminal to location classification system 101 according to the illustrative embodiment of the present invention. FIG. 2 depicts: location classification system 101; wireless network infrastructure 104; base station controllers 106-1, 106-2, and 106-3; base stations 107-1 (unlabeled), 107-2, and 107-3 (unlabeled), which provide service to cells 201-1, 201-2, and 201-3, respectively; wireless terminal 150; signal reports 203; signal path 205; and data store 207.

Wireless network infrastructure 104, base station controllers 106-1, 106-2, and 106-3, base stations 107-1 (unlabeled), 107-2, and 107-3 (unlabeled), and wireless terminal 150 are the same as described above in regard to FIG. 1 and are well known in the art.

As depicted in FIG. 1, wireless terminal 150 "sees" beacon signals from one or more antennas of each of the several base stations 107. Thus, wireless terminal 150 receives RF signals from base stations 107-1, 107-2, and 107-3, and has an active two-way communication link with only one—base station 107-2. As illustrated in FIG. 2, base station 107-2 supports serving cell 201-2, which provides the service that enables voice and/or data services to/from wireless telecommunications terminal 150. The other cells, e.g., 201-1 and 201-3, are "neighbor cells" that do not provide active voice/data service to wireless terminal 150, even though their beacon signals are received by wireless terminal 150. Whether a cell is a serving cell or a neighbor cell will be important in some of the considerations pertaining to the present invention, as described in more detail in regard to method 400 below.

Thus, wireless terminal 150 receives a plurality of wireless signals from a plurality of antennas, each signal being received by the wireless terminal with a given signal strength, e.g., measured in dBm. Wireless terminal 150 empirically measures the received signal strengths. According to the illustrative embodiment, the received signal strengths are periodically reported by wireless terminal 150 in a signal report 203. Wireless terminal 150 also reports the signal strengths of the signals that it ordinarily transmits to the serving cell. Illustratively, a signal report 203 is reported by wireless terminal 150 to its serving cell, e.g., cell 201-2, via signal path 205.

Signal path 205 carries signal report 203 via the corresponding base station controller, e.g., 106-2, and via other elements of wireless network infrastructure 104 to location classification system 101. It will be clear to those having ordinary skill in the art, after reading the present disclosure, how to make and use alternative embodiments in which signal report 203 comprises only some, but not all, signal strengths received by wireless terminal 150—typically, the number of reported signals in signal report 203 is an implementation detail of wireless network 130, e.g., signals from the serving cell plus six neighbor cells. It will be further clear to those having ordinary skill in the art, after reading the present disclosure, how to make and use alternative embodiments in which at least some of the reported-on signal strengths are deduced by the base station controller, e.g., 107-2; accordingly, in these alternative embodiments, an illustrative version of signal report 203 comprises both terminal-reported and base-station-reported signal strengths in reference to wireless signals that were received by the wireless terminal. Signal reports 203 are well known in the art, and an important advantage of the present invention is that it does not require modifications or enhancements to wireless terminals or to network infrastructure.

As will be discussed in more detail below in regard to method 400, location classification system 101 receives a plurality of signal reports 203 over a period of time, and analyzes the received data according to the present invention. The illustrative period of time is twenty seconds, but it will be clear to those having ordinary skill in the art, after reading the present disclosure, how to make and use alternative embodiments of the present invention that employ a different period of time or a different number of signal reports 203 per reporting cycle.

Data store 207 is digital data storage that comprises non-transient memory and ancillary storage and retrieval capabilities that are well known in the art. The data that is stored in and retrieved from data store 207 will be discussed in more detail below.

Figure 3:
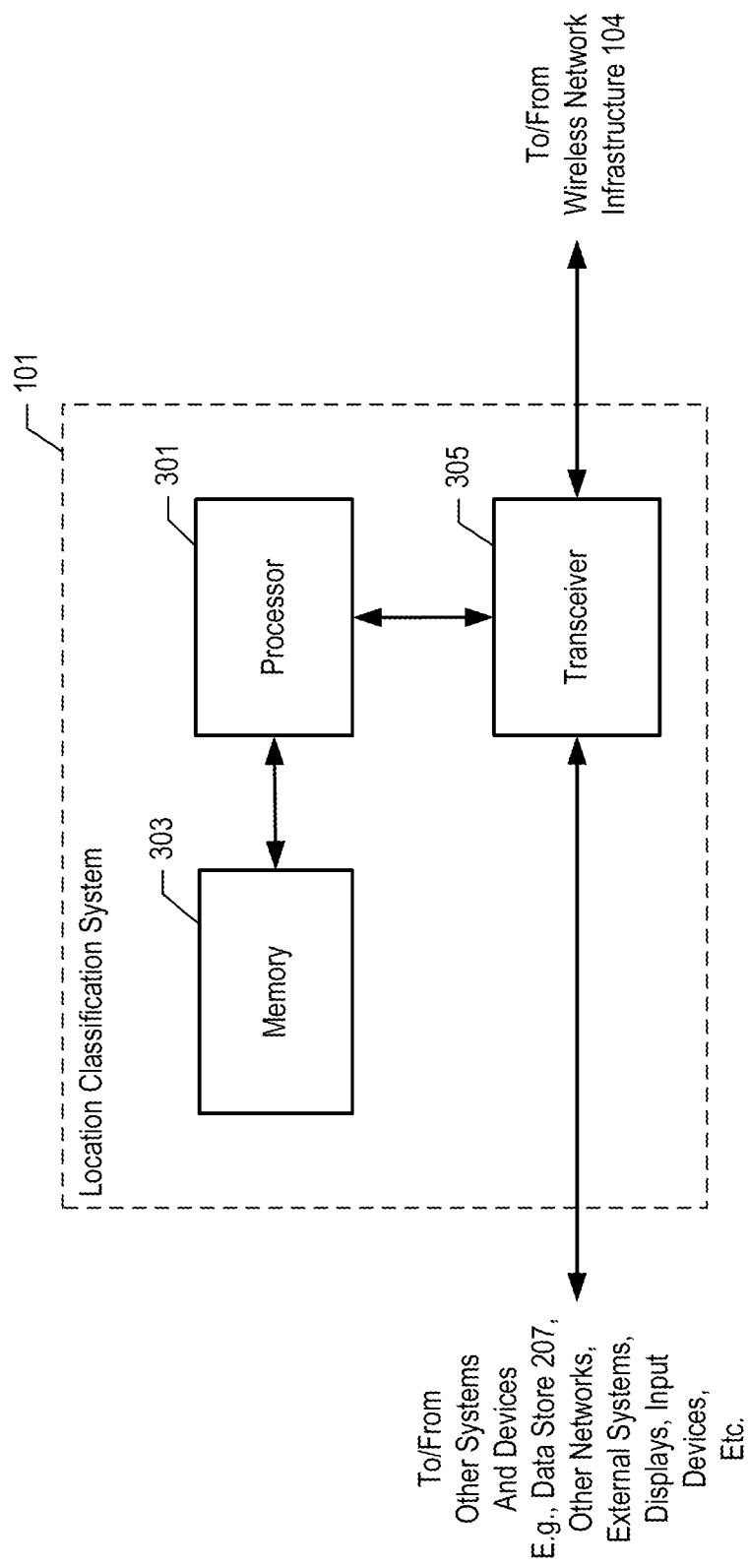
FIG. 3 depicts a block diagram comprising the salient elements of the hardware platform for location classification system 101.

FIG. 3 depicts a block diagram comprising the salient elements of the hardware platform for location classification system 101 according to the illustrative embodiment. Location classification system 101 comprises: processor 301; memory 303; and transceiver 305. Location classification system 101 comprises the hardware and requisite application software to execute software, receive signals, transmit signals, and process data such that it performs the operations described herein.

Processor 301 is a processing device such as a microprocessor that, in conjunction with the other components location classification system 101, is capable of executing the software and processing the data according to the operations described herein. Processor 301 is well known in the art.

Memory 303 is a non-transitory memory that stores program code and data sufficient to enable the execution of the specialized software and data processing according to the operations recited herein. Memory 303 is well known in the art and may comprise a plurality of segments. Other examples of data that are illustratively stored in memory 303 include, without limitation: drive-test results including an RF map of the coverage areas of the wireless network; network-specific data received from data store 207; etc.

Transceiver 305 is a component that enables location classification system 101 to communicate electronically with other components internal and external to location classification system 101, including without limitation receiving signals, transmitting signals, and enabling communication pathways to/from other systems and devices, e.g., wireless network infrastructure 104 component(s), data store 207, other networks, external systems, displays, input devices, other data-processing systems, etc. Transceiver 403 is well known in the art.

The application software that is executed on the hardware platform by location classification system 101 enables the system to perform the operations in method 400, which is depicted in FIG. 4. It will be clear to those having ordinary skill in the art, after reading the present disclosure, that location classification system 101 can be embodied as a multi-processor platform, as a server, as a sub-component of a larger computing platform, or in some other computing environment—all within the scope of the present invention. It will be clear to those having ordinary skill in the art, after reading the present disclosure, how to make and use the data-processing hardware platform for location classification system 101.

FIG. 4 depicts a flowchart depicting some salient operations of illustrative method 400 according to the illustrative embodiment of the present invention. According to the illustrative embodiment depicted herein, location classification system 101 executes and coordinates the operations of method 400.

At operation 401, location classification system 101 receives network-specific data from a variety of sources. There are numerous sources of network-specific data, including data from the network operator having to do with installation and operational details, geographic information pertaining to the coverage area of the network, and data that pertains to the particular network but which is specific to location classification system 100. These will be discussed in more detail below and in the accompanying figures. Examples of network-specific data include, without limitation, geographic information, a frequency plan, antenna geo-locations, etc. However, it should be noted that with regard to any particular wireless network one or more of the illustrated data sets may be wholly or partially unavailable; therefore, it will be clear to those having ordinary skill in the art, after reading the present disclosure, how to make and use alternative embodiments that lack some of the recited network-specific data.

At operation 402, location classification system 101 generates, for each factor $x_i$ according to the present invention, a corresponding weight $w_i$ that is based on the network-specific data and reflects the contribution of the factor to the characteristic being analyzed, e.g., indoors versus indoors. The particular factors were introduced in the Summary section and will be discussed in more detail below. The present operation concerns itself with how much each factor is to be weighed in generating a probability. For example, how much does the factor "the number of neighbor cells corresponding to the reported-on signals" contribute to the probability that the reported-on signals were received indoors in network 103? To determine what the weight should be, a network-specific "learning" analysis is executed.

Because each wireless network has its own unique configuration, installation, RF environment, and geographic coverage areas, each factor may contribute more or less to the estimated probability depending on network specifics. Moreover, a given factor may be more indicative of one characteristic, e.g., indoors versus outdoors, than another characteristic, e.g., pedestrian versus vehicular speed. Drive tests are conducted throughout the network to collect signal strength patterns from a large number of locations throughout the coverage area. The illustrative embodiment applies machine learning techniques to the network-specific data to identify the extent that a given factor $x_i$ in the given network contributes to the relevant probability, and a corresponding weight $w_i$ is assigned to each factor, reflecting that factor's behavior in the particular network. Drive tests, data collection, and machine learning techniques are all well known in the art. It will be clear to those having ordinary skill in the art, after reading the present disclosure, how to make and use alternative embodiments wherein a technique other than machine learning provides the weights that correspond to each factor.

At operation 403, location classification system 101 receives a plurality of signal reports 203, wherein the reported-on signals are received by wireless terminal 150 from one or more cells in wireless network 103 during a pre-defined period of time. As noted previously in regard to signal report 203, the analysis performed by location classification system 101 according to the illustrative embodiment requires a number of signal reports 203 that cover a pre-defined period of time, illustratively 20 seconds.

At operation 405, location classification system 101 has received network-specific data as well as signal reports sufficient to evaluate each factor $x_i$. Each factor is probative of one or more of the following characteristics or behaviors. Each factor is probative of whether the reported-on signals were received by wireless terminal 150:
  (i) indoors versus outdoors, and/or
  (ii) "above-the-clutter" versus "below-the-clutter" of ambient wireless signals, and/or
  (iii) while moving at a certain speed classification, e.g., stationary/pedestrian versus vehicular speed.

A given factor is said to be probative, because it tends to prove or disprove the particular characteristic, e.g., indoors versus outdoors. Notably, the value of the factor is not a guarantee of the particular characteristic or behavior. Rather, each factor contributes to the joint estimated probability that is generated in operation 407.

In the present operation, 405, location classification system 101 extracts from the data available a value for each factor $x_i$. For example, if factor $x_1$ is based on "the number of neighbor cells corresponding to the reported-on signals," and the factor is defined as "the number of neighbor cells averaged over the receiving period of time," location classification system 101 determines how many neighbor cells correspond to the set of signal reports 203 in the applicable period of time and takes the average over the period of time.

At operation 406, location classification system 101 generates a factor vector that comprises one more of the factors xi. Typically the factor vector is directed at a particular location-related characteristic or behavior, such as indoor reception, speed classification, clutter classification, etc. Thus, for example, factor vector X is directed at indoor reception and comprises factors that are probative of indoor/outdoor characterization, illustratively factors $x_1$, $x_2$, and $x_5$. It will be clear to those having ordinary skill in the art, after reading the present disclosure, how to make and use alternative embodiments where the factor vector comprises all available factors without being directed at a particular characteristic.

At operation 407, location classification system 101 generates an estimated probability that is jointly based on the factors $x_i$ in the given factor vector (illustratively factors $x_1$, $x_2$, and $x_5$) and their corresponding weights $w_i$. The estimated probability collectively reflects the contribution of all the factors in the factor vector according to their respective corresponding weights. The estimated probability is thus directed at one or more of the location-related characteristics, including without limitation, the probability that the reported-on signals were received by wireless terminal 150:
  (i) indoors versus outdoors, and/or
  (ii) "above-the-clutter" versus "below-the-clutter" of ambient wireless signals, and/or
  (iii) while moving at a certain speed classification, e.g., stationary/pedestrian versus vehicular speeds.

According to the illustrative embodiment, operation 407 generates one estimated probability per factor vector, but it will be clear to those having ordinary skill in the art, after reading the present disclosure, how to make and use alternative embodiments wherein operation 407 generates a joint probability figure that reflects a plurality of factor vectors. It will be further clear to those having ordinary skill in the art, after reading the present disclosure, how to make alternative embodiments in which operation 407 generates, instead of probabilities, a binary classification that categorizes:
  (i) the location as either indoors or outdoors, and/or
  (ii) the location as either "above-the-clutter" or "below-the-clutter" of ambient wireless signals, and/or
  (iii) the speed of the wireless terminal as stationary/pedestrian or vehicular.

It will be further clear to those having ordinary skill in the art, after reading the present disclosure, how to make and use alternative embodiments wherein one or more of the classifications are other than binary, e.g., ternary, quaternary, etc.

Whether it generates a classification or a probability, operation 407 reflects a collective analysis of a number of considerations that may help reduce the computational burden on the location estimation function in the next operation. In a preferred embodiment, the plurality of factors (and their corresponding network-specific weights) are applied collectively to arrive at a probability, e.g., the probability that wireless signals were received indoors. Thus, the estimated probability represents a collective assessment characterizing the terminal's location. The collective assessment, based on a plurality of factors rather than a factor-by-factor analysis, has been empirically shown by the inventor to provide increased accuracy in estimating the location of the wireless terminal.

At operation 409, location classification system 101 executes a location estimator function. The location estimator function eliminates certain candidate locations from further consideration and generates one or more estimated locations for wireless terminal 150 such that each estimated location is based on the one or more probabilities generated in operation 407. Here, the estimated probability(ies) are applied to the candidate locations under consideration by the location estimator function. Applying the probability(ies) helps eliminate inappropriate candidates from further location analysis, thus enabling computational resources to focus on the remaining higher-likelihood candidate locations.

In the prior art, location estimation techniques do not consider the probabilities generated in operation 407 as a factor in the analysis of candidate locations.

According to the illustrative embodiment, location classification system 101 has indoor/outdoor information available from the geographic information system ("GIS") data. (See FIG. 5). Additionally, the geographic area covered by the wireless network has been subdivided into relatively small sub-divisions—referred to herein as "pre-defined locations"—that are each characterized as indoors or outdoors from the GIS data. For example, all the pre-defined locations covered by the footprint of a high-rise building or a warehouse are characterized as indoors. However, this characterization is not known to or is otherwise ignored by prior art location estimators. The prior art gives all candidate locations effectively equal computational consideration.

In contrast, the present invention enables the location estimator function to discriminate among candidate locations based on the additional information provided by the estimated probabilities generated in operation 407. To continue the above-mentioned scenario, when the probabilities generated in operation 407 are applied, only those pre-defined locations that are flagged as indoors will remain viable candidates for the estimated location of the wireless terminal. The outdoors pre-defined locations will be filtered out, thus winnowing the list of candidate locations and providing a substantial computational advantage as well as, ultimately, improved accuracy in the location estimate. Likewise, it will be clear to those having ordinary skill in the art, after reading the present disclosure, how to make alternative embodiments wherein candidate locations are winnowed according to a classification (rather than a probability) that is generated in operation 407. It will be further clear to those having ordinary skill in the art, after reading the present disclosure, how to make and use alternative embodiments wherein the probability or classification is a basis for generating estimated locations, but does not necessarily eliminate a candidate location from further consideration; for example, in such embodiments, the probability or classification is applied alongside other considerations in evaluating candidate locations.

Regardless of the implementation details, the location estimate for the wireless terminal (generated by operation 409) is based on the probability or classification generated by location classification system 101 based on the one or more factors (generated by operation 407). Thus, the location estimate is based these one or more factors.

At operation 411, the one or more estimated locations and other data generated in the preceding operations is transmitted by location classification system 101 to another system, such as a surveillance and tracking system, an emergency handling system, etc. Additionally, location classification system 101 also archives data internally and/or to data store 207. Archived data can be used to enhance the network-specific data.

It will be clear to those having ordinary skill in the art, after reading the present disclosure, how to make and use alternative embodiments of method 400 wherein the operations are differently sequenced, grouped, or sub-divided—all within the scope of the present invention. It will be further clear to those having ordinary skill in the art, after reading the present disclosure, how to make and use alternative embodiments of method 400 wherein some of the recited operations are omitted; or wherein some of the recited operations or their constituent sub-operations are executed by other elements of wireless network 103 or by a system other than location classification system 101, such as a location determination system that is in communication with location classification system 101.

FIG. 5 depicts a flowchart depicting the salient operations of illustrative operation 401 according to the illustrative embodiment of the present invention. The data received and/or processed in this operation is collectively referred to as network-specific data.

At operation 501, location classification system 101 receives data from a geographic information system ("GIS") that is well known in the art. Illustratively, the GIS data is archived and stored in data store 207 from where it is received by location classification system 101. The GIS comprises electronic maps and information about the terrain covered by wireless network 103, for example indicating where there are water surfaces, buildings, etc.

At operation 503, location classification system 101 receives installation-specific data about wireless network 103. Typically, this information is obtained from the network operator. The type of data and degree of detail will vary from network to network. More detail is provided in reference to FIG. 6.

At operation 505, location classification system 101 receives a frequency plan of wireless network 103, typically from the network operator. The frequency plan is well known in the art.

At operation 507, location classification system 101 receives the set of pre-defined locations that are covered by wireless network 103. The size of a pre-defined location depends on the implementation of location classification system 101; according to the illustrative embodiment, a pre-defined location is a 3-meter by 3-meter square. Each pre-defined location is characterized as indoors or outdoors from the GIS data. For example, all the pre-defined locations covered by the footprint of a high-rise building are characterized as indoors. It will be clear to those having ordinary skill in the art, after reading the present disclosure, how to make and use alternative embodiments wherein, rather than receiving the pre-defined locations with their characterizations, location classification system 101 performs the operations of defining the pre-defined locations and characterizing each one based on the GIS data. Examples of characterizations for a pre-defined location include without limitation: indoors, outdoors, high-elevation, low-elevation, etc. It will be clear to those having ordinary skill in the art, after reading the present disclosure, how to make and use alternative embodiments with differently-sized pre-defined locations and with different characterizations.

At operation 509, location classification system 101 receives distances as between antennas in the wireless network. It will be clear to those having ordinary skill in the art, after reading the present disclosure, how to make and use alternative embodiments wherein location classification system 101 determines the distances between the antennas based on installation-specific data such as antenna geo-locations that were received in an earlier operation.

FIG. 6 depicts a flowchart depicting the salient operations of illustrative operation 503 according to the illustrative embodiment of the present invention. At operation 503, location classification system 101 receives installation-specific data about wireless network 103. According to the illustrative embodiment, this information is obtained from the network operator. It will be clear to those having ordinary skill in the art, after reading the present disclosure, how to make and use alternative embodiments wherein the type of data, characterizations, and degree of detail vary from network to network. It will be further clear to those having ordinary skill in the art, after reading the present disclosure, that in some embodiments, location classification system 101 will perform additional operations—that are well known in the art—upon the installation-specific data received here in order to bring such data in conformance with the data structures and operations of location classification system 101.

At operation 601, location classification system 101 receives, for at least one cell in the wireless network, e.g., cell 201-1, a characterization of the geographic area covered by the cell. Examples of characterizations include without limitation: indoors, outdoors, urban, rural, high-elevation, low-elevation, etc.

At operation 603, location classification system 101 receives, for at least one antenna in the wireless network, an indication of whether the antenna is located indoors or outdoors.

At operation 605, location classification system 101 receives, for at least one antenna in the wireless network, a height of the antenna. Examples of height include without limitation: the physical height of the base station tower on which the antenna is mounted, the height from ground level where an antenna is mounted, the elevation of an antenna, the height of the antenna unit, etc.

At operation 607, location classification system 101 receives, for at least one antenna in the wireless network, a geo-location of the antenna. Examples of geo-location include without limitation: the geographic coordinates of an antenna without elevation, the geographic coordinates of an antenna with elevation, a street address where the antenna is installed, etc. Geo-locations are well known in the art, as are methods for converting from one form of denominating locations to another.

FIG. 7 depicts a flowchart depicting a salient sub-operation of illustrative operation 405 according to the illustrative embodiment of the present invention. In operation 405, location classification system 101 evaluates each factor based on the reported-on signal strengths and also based on network-specific data.

At operation 701, location classification system 101 evaluates one or more factors that are probative of whether the reported-on signals in signal reports 203 were received indoors versus outdoors.

Illustrative factors that are probative of whether the reported-on signals were received by a wireless terminal indoors versus outdoors, according to operation 701, are based on one or more of the following considerations, without limitation:

(i) (a) a measure of the reported-on signal strengths received by the wireless terminal from a first cell relative to (b) the measure of the reported-on signal strengths received by the wireless terminal from a second cell;
all other considerations being equal, when the signal strengths from a known indoor cell are stronger than from a known outdoor cell, the factor tends to indicate that the signals were received indoors;
conversely, when the signal strengths from a known outdoor cell are stronger than from a known indoor cell, the factor tends to indicate that the signals were received outdoors;

(ii) the number of neighbor cells corresponding to the reported-on signals;
all other considerations being equal, when the number of reported-on neighbor cells is relatively small, the factor tends to indicate that the signals were received indoors, where propagation tends to be weaker;
conversely, when the number of reported-on neighbor cells is relatively large, the factor tends to indicate that the signals were received outdoors, where propagation tends to be stronger;

(iii) (a) the number of neighbor cells corresponding to the reported-on signals relative to (b) a value that the data-processing system associates with at least one of (A) outdoor coverage by the wireless network and (B) indoor coverage by the wireless network;

all other considerations being equal, when the number of reported-on neighbor cells is compared relative to network-specific indoor and outdoor coverage characteristics (collected, for example, during drive tests), the factor tends to indicate a similarity to indoor coverage, or, conversely, to outdoor coverage as manifested in the present wireless network;

(iv) a measure of statistical dispersion of the reported-on signal strengths received by the wireless terminal;

all other considerations being equal, because of poor propagation indoors relative to outdoors, when a measure of statistical dispersion indicates relatively higher dispersion among the received signal strengths (e.g., high standard deviation), the factor tends to indicate that the signals were received indoors; likewise, perhaps because of lower received power indoors, a relatively low mean may indicate that the signals were received indoors;

conversely, relatively lower dispersion and/or higher mean received signal strength tends to indicate outdoors reception;

the measure of statistical dispersion of the reported-on signal strengths received by the wireless terminal is defined as one of:
  (i) the standard deviation,
  (ii) the mean,
  (iii) the minimum,
  (iv) the maximum,
  (v) the median,
  (vi) the range,
  (vii) the ratio of the mean to the standard deviation of the signal strengths received by the wireless terminal from a reported-on antenna, and
  (viii) the ratio of the mean to the standard deviation of the signal strengths received by the wireless terminal from all reported-on antennas,
  (ix) other measures that are also known in the art.

(v) (a) a measure of statistical dispersion of the reported-on signal strengths received by the wireless terminal relative to (b) a value that the data-processing system associates with at least one of (A) outdoor coverage by the wireless network and (B) indoor coverage by the wireless network;

all other considerations being equal, when the a measure of statistical dispersion is compared relative to network-specific indoor and outdoor coverage characteristics (collected, for example, during drive tests), the factor tends to indicate a similarity to indoor coverage, or, conversely, to outdoor coverage as manifested in the present wireless network;

the measure of statistical dispersion of the reported-on signal strengths received by the wireless terminal is defined as above;

(vi) a measure of statistical dispersion of the reported-on signal strengths received by the wireless terminal, and wherein the measure is defined as one of (a) a ratio of the mean to the standard deviation of the signal strengths received by the wireless terminal from a reported-on antenna, and (b) a collective ratio of the mean to the standard deviation of the signal strengths received by the wireless terminal from all reported-on antennas;

all other considerations being equal, a K-factor (defined here as the ratio of the mean to the standard deviation) is a measure of statistical dispersion of the received signal strengths such that, because of poor propagation indoors relative to outdoors, when the k-factor is relatively low, the factor tends to indicate that the signals were received indoors;

conversely, a relatively high k-factor tends to indicate outdoors reception;

(vii) a measure of antenna height corresponding to at least some of the cells providing the reported-on signals;

all other considerations being equal, antenna height can correlate to indoors versus outdoors coverage, such that when an antenna height is known to be low, the factor tends to indicate that the signals were received (or at least transmitted by the antenna) indoors;

conversely, when an antenna height is known to be high, the factor tends to indicate that the signals were received outdoors;

a measure of antenna height is defined as one of:
  (i) the height of the antenna of the serving cell for the reported-on signals,
  (ii) the heights of the antennas of all the cells for the reported-on signals,
  (iii) a majority of the heights of the antennas of all the cells for the reported-on signals.

(viii) a measure of statistical dispersion of the set of distances between the antenna of a reported-on serving cell and the antenna of each reported-on neighbor cell;

all other considerations being equal, because of poor propagation indoors relative to outdoors, indoor antennas tend to be more closely spaced, and therefore when a measure of statistical dispersion of the inter-antenna distances is a relatively low number, the factor tends to indicate that the wireless signals were received indoors;

conversely, a relatively high measure of statistical dispersion of inter-antenna distances tends to indicate outdoors reception;

the measure of statistical dispersion of the set of distances is defined as at least one of:
  (i) the standard deviation,
  (ii) the mean,
  (iii) the minimum,
  (iv) the maximum,
  (v) the median, and
  (vi) the range, and
  (vii) a majority of the distances.

(ix) (a) a measure of statistical dispersion of the set of distances between the antenna of a reported-on serving cell and the antenna of each reported-on neighbor cell relative to (b) a value that is derived by the data-processing system from data that is specific to the wireless network;

all other considerations being equal, when the a measure of statistical dispersion is compared relative to network-specific data (collected, for example, during drive tests), the factor tends to indicate network-specific indoor or outdoor coverage;

the measure of statistical dispersion is defined as above, e.g., standard deviation, mean, maximum, etc.;

(x) a factor that tends to prove that the reported-on signals were received by the wireless terminal "above-the-clutter" of ambient wireless signals;

this is explained in further detail below, but all other considerations being equal, an "above-the-clutter" characterization tends to indicate a setting in a high-rise, i.e., indoors, when the neighboring geography is urban or suburban; otherwise, when the neighboring geography is rural, an "above-the-clutter" characterization tends to indicate an outdoors setting such as a hill or mountain;

(xi) a factor that tends to prove that the reported-on signals were received while the wireless terminal was moving at vehicular speeds;

this is explained in more detail below, but all other considerations being equal, a high-speed environment tends to indicate an outdoors, not an indoors, location.

At operation 705, location classification system 101 evaluates one or more factors that are probative of whether the reported-on signals in signal reports 203 were received "above-the-clutter" of ambient wireless signals or "below-the-clutter".

Illustrative factors that are probative of whether the reported-on signals were received by a wireless terminal "above-the-clutter" versus "below-the-clutter," according to operation 705, are based on one or more of the following considerations, without limitation:

(i) a measure of the signal strengths of the reported-on signals;

all other considerations being equal, when the reported-on signals are relatively strong, they tend to indicate free space or an uncluttered environment, and therefore the factor tends to indicate that the signals were received at a location "above-the-clutter;"

conversely, relatively low received signal strengths tend to indicate a more cluttered environment, i.e., "below-the-clutter";

(ii) (a) a measure of the signal strengths of the reported-on signals relative to at least one of (A) the measure of signal strengths characterized as above-the-clutter in the wireless network and (B) the measure of signal strengths characterized as below-the-clutter in the wireless network;

all other considerations being equal, when a measure of the signal strengths is compared relative to network-specific indoor and outdoor coverage characteristics (collected, for example, during drive tests), the factor tends to indicate a similarity to indoor coverage, or, conversely, to outdoor coverage as manifested in the present wireless network;

(iii) a measure of hand-over frequency or the number of hand-overs occurring during the reported-on period of time;

all other considerations being equal, when a wireless terminal receives many strong signals from many close-by cells, hand-overs may be triggered, sometimes causing a back-and-forth (or "ping-pong") effect that tends to indicate "above-the-clutter" reception where distant signals propagate well and are received at relatively high power;

(iv) a measure of the signal strengths of signals received from distant antennas;

all other considerations being equal, when distant signals are strong, the factor tends to indicate "above-the-clutter" reception, because propagation loss over the relatively large distance is low or relatively low relative to a "below-the-clutter" environment;

(v) a measure of statistical dispersion of the reported-on signal strengths received by the wireless terminal;

all other considerations being equal, because of poor propagation in RF-cluttered "below-the-clutter" environments relative to "above-the-clutter" environments, when a measure of statistical dispersion indicates relatively higher dispersion among the received signal strengths (e.g., high standard deviation), the factor tends to indicate that the signals were received "below-the-clutter"; likewise, because of lower received power "below-the-clutter," a relatively low mean tends to indicate "below-the-clutter" reception;

conversely, relatively lower dispersion and/or higher mean received signal strength tends to indicate reception "above-the-clutter";

the measure of statistical dispersion is defined as above in paragraph [0078];

(vi) a measure of the heights of neighbor-cell antennas;

all other considerations being equal, a location that is "above-the-clutter" tends to receive signals from high antennas, which tends to be reflected in a measure of the heights of the neighbor-cell antennas;

conversely, a relatively low measure of height of neighbor-cell antennas tends to indicate a "below-the-clutter" location;

(v) a reported-on signal is received from a neighbor-cell antenna that is known to be of a low height and tilted upwards—according to network-specific data;

all other considerations being equal, an "above-the-clutter" location is positioned higher than "below-the-clutter" antennas and ordinarily would not receive signals from "below-the-clutter" antennas; however, receiving such a signal from an upturned "below-the-clutter" antenna tends to indicate "above-the-clutter" reception at the wireless terminal;

(vi) a factor that indicates indoors reception according to operation 701;

these factors were described in more detail above, but all other considerations being equal, a factor that indicates indoors reception also can indicate "above-the-clutter" reception, e.g., in a high-rise, based on network-specific installation data; notably, such a factor might have a different weight in calculating the probability of "above-the-clutter" versus "below-the-clutter" reception as compared to the weight in the indoors-versus-outdoors analysis;

(vii) a factor that indicates outdoors reception according to operation 703;

these factors were described in more detail above, but all other considerations being equal, a factor that indicates outdoors reception also can indicate a ground-level "below-the-clutter" reception; notably, such a factor might have a different weight in calculating the probability of "above-the-clutter" versus "below-the-clutter" reception as compared to the weight in the indoors-versus-outdoors analysis;

(viii) a pre-defined classification of speed of the wireless terminal, e.g., stationary/pedestrian versus moving at vehicular speeds, wherein the classification of speed is based on whether the identity of the serving cell changed during the reported-on period of time;

this is explained in more detail below, but all other considerations being equal, a high-speed environment tends to indicate an outdoors "below-the-clutter" location; notably, such a factor might have a different weight in calculating the probability of "above-the-clutter" versus "below-the-clutter" reception as compared to the weight in the speed analysis;

(iv) a pre-defined classification of speed of the wireless terminal, e.g., stationary/pedestrian versus moving at vehicular speeds, wherein the classification of speed is based on a change in a measure of the reported-on signal strengths relative to the reported-on period of time;

this is explained in more detail below, but all other considerations being equal, a high-speed environment tends to indicate an outdoors "below-the-clutter" location; notably, such a factor might have a different weight in calculating the probability of "above-the-clutter" versus "below-the-clutter" reception as compared to the weight in the speed analysis.

At operation 709, location classification system 101 evaluates one or more factors that are probative of a speed classification of the wireless terminal, e.g., stationary/pedestrian speeds versus vehicular speeds.

Illustrative factors that are probative of whether the reported-on signals were received by a wireless terminal while stationary/pedestrian versus moving at vehicular speeds, according to operation 709, are based on one or more of the following considerations, without limitation:

(i) whether the identity of the serving cell changed during the reported-on period of time;
  all other considerations being equal, because the reported-on period of time is relatively short, e.g., twenty seconds, a stationary or slow-moving/pedestrian wireless terminal would tend to be served by the same cell throughout the period of time;
  conversely, when the serving cell changes during the period of time, the factor tends to indicate that the speed of the wireless terminal should be classified as "fast" or "vehicular speeds;"

(ii) a change in a measure of the reported-on signal strengths relative to the period of time, e.g., a substantial change in mean received signal strength
  all other considerations being equal, because the reported-on period of time is relatively short, e.g., twenty seconds, a stationary or slow-moving/pedestrian wireless terminal would tend to experience a relatively steady measure of received signal strength throughout the time period;
  conversely, when the measure of signal strengths is variable (perhaps relative to a network-specific statistic), the factor tends to indicate that the speed of the wireless terminal should be classified as "fast" or "vehicular speeds."

(iii) a change during the reported-on period in the number of neighbor cells;
  all other considerations being equal, when the number of neighbor cells remains the same throughout the reported-on period of time, the factor tends to indicate a stationary wireless terminal, or one moving relatively slowly at pedestrian speeds;
  conversely, when the number of neighbor cells changes during the reported-on period of time, the factor tends to indicate higher vehicular speeds for the wireless terminal;

(iv) a measure of the strength of the reported-on signals, e.g., mean received signal strength;
  all other considerations being equal, a wireless terminal traveling on the road or highway is farther from obstructions and tends to receive stronger signals; therefore the factor tends to indicate vehicular speeds when the measure of received signal strength (e.g., mean) is higher;
  conversely, the factor tends to indicate pedestrian speeds when the measure of received signal strength is lower, because a pedestrian on a sidewalk tends to experience more RF obstruction;

(v) a factor that indicates indoors reception according to operation 701;
  these factors were described in more detail above, but all other considerations being equal, a factor that indicates indoors reception also can indicate "above-the-clutter" reception, e.g., in a high-rise, based on network-specific installation data; notably, such a factor might have a different weight in calculating the speed classification/probability as compared to the weight in the indoors-versus-outdoors analysis;

(vi) a factor that indicates outdoors reception according to operation 703;
  these factors were described in more detail above, but all other considerations being equal, a factor that indicates outdoors reception also can indicate a ground-level "below-the-clutter" reception; notably, such a factor might have a different weight in calculating the speed classification/probability as compared to the weight in the indoors-versus-outdoors analysis.

Numerous corollaries of these factors, while not described in detail herein, fall well within the scope of the present invention. When reviewing the above-listed considerations on which the disclosed factors are based, it should be remembered that each individual factor typically does not provide a guarantee, but instead, it tends to prove a particular characterization, e.g., slow-moving versus vehicular speeds. In generating the joint probability or classification according to operation 407, location classification system 101 produces a more powerful assessment of the collective effect of these individual factors. In other words, a major advantage accruing to the illustrative embodiment is in analyzing the collective effect of several factors, based on their corresponding network-specific weights, to ultimately arrive at a higher quality estimate of the terminal's location.

It should be further noted that one factor can also be based, at least in part, on another factor. For example, an environment classified as high (vehicular) speed is unlikely to be located indoors.

It will be clear to those having ordinary skill in the art, after reading the present disclosure, how to use other variations and corollaries of the above-listed factors while remaining well within the scope of the present invention. It is to be understood that the disclosure teaches just some examples of the illustrative embodiment and that many variations of the invention can easily be devised by those skilled in the art after reading the present disclosure. The scope of the present invention is to be determined by the following claims.

What is claimed is:

1. A method associated with a wireless network, the method comprising:
  receiving, by a data-processing system, reports on the signal strengths of wireless signals received by a wireless terminal from a plurality of antennas in the wireless network;
  evaluating, by the data-processing system, a plurality of factors based on the reports, wherein each factor is probative of whether the reported-on signals were received indoors by the wireless terminal;
  generating, by the data-processing system, an estimated probability that the reported-on signals were received indoors by the wireless terminal, based on the plurality of factors, wherein each factor is weighted according to a corresponding weight that is specific to the wireless network; and
  generating, based on the probability, an estimated first location for the wireless terminal, thereby eliminating, also based on the probability, a second location for the wireless terminal.

2. The method of claim 1 wherein a first factor in the plurality of factors is based on at least one of:
  (i) (a) a measure of the reported-on signal strengths received by the wireless terminal from a first cell relative to (b) the measure of the reported-on signal strengths received by the wireless terminal from a second cell;
  (ii) the number of neighbor cells corresponding to the reported-on signals;
  (iii) (a) the number of neighbor cells corresponding to the reported-on signals relative to (b) a value that the data-processing system associates with at least one of (A) outdoor coverage by the wireless network and (B) indoor coverage by the wireless network;
  (iv) a measure of statistical dispersion of the reported-on signal strengths received by the wireless terminal;
  (v) (a) a measure of statistical dispersion of the reported-on signal strengths received by the wireless terminal relative to (b) a value that the data-processing system associates with at least one of (A) outdoor coverage by the wireless network and (B) indoor coverage by the wireless network;
  (vi) a measure of statistical dispersion of the reported-on signal strengths received by the wireless terminal, wherein the measure is defined as one of (a) a ratio of the mean to the standard deviation of the signal strengths received by the wireless terminal from a reported-on antenna, and (b) a collective ratio of the mean to the standard deviation of the signal strengths received by the wireless terminal from all reported-on antennas;
  (vii) a measure of antenna height corresponding to at least some of the cells providing the reported-on signals;
  (viii) a measure of statistical dispersion of the set of distances between the antenna of a reported-on serving cell and the antenna of each reported-on neighbor cell; and
  (ix) (a) a measure of statistical dispersion of the set of distances between the antenna of a reported-on serving cell and the antenna of each reported-on neighbor cell relative to (b) a value that is derived by the data-processing system from data that is specific to the wireless network.

3. The method of claim 1 wherein the reports comprise wireless-signal measurements performed by the wireless terminal.

4. The method of claim 1 wherein the reports comprise wireless-signal measurements performed by an element of the wireless network infrastructure that is distinct from the wireless terminal.

5. The method of claim 1 wherein a first factor in the plurality of factors is based on (a) a measure of the reported-on signal strengths received by the wireless terminal from a first cell relative to (b) the measure of the reported-on signal strengths received by the wireless terminal from a second cell.

6. The method of claim 5 wherein the first cell is characterized by the data-processing system as an indoor cell and the second cell is characterized as an outdoor cell.

7. The method of claim 1 wherein a first factor in the plurality of factors is based on the number of neighbor cells corresponding to the reported-on signals.

8. The method of claim 1 wherein a first factor in the plurality of factors is based on (a) the number of neighbor cells corresponding to the reported-on signals relative to (b) a value that the data-processing system associates with at least one of (A) outdoor coverage by the wireless network and (B) indoor coverage by the wireless network.

9. The method of claim 1 wherein a first factor in the plurality of factors is based on at least one measure of statistical dispersion of the reported-on signal strengths received by the wireless terminal.

10. The method of claim 1 wherein a first factor in the plurality of factors is based on (a) a measure of statistical dispersion of the reported-on signal strengths received by the wireless terminal relative to (b) a value that the data-processing system associates with at least one of (A) outdoor coverage by the wireless network and (B) indoor coverage by the wireless network.

11. The method of claim 1 wherein a first factor in the plurality of factors is based on a measure of statistical dispersion of the reported-on signal strengths received by the wireless terminal, and wherein the measure is defined as one of (a) a ratio of the mean to the standard deviation of the signal strengths received by the wireless terminal from a reported-on antenna, and (b) a collective ratio of the mean to the standard deviation of the signal strengths received by the wireless terminal from all reported-on antennas.

12. The method of claim 1 wherein a first factor in the plurality of factors is based on a measure of antenna height corresponding to at least some of the cells providing the reported-on signals.

13. The method of claim 1 wherein a first factor in the plurality of factors is based on a measure of statistical dispersion of the set of distances between the antenna of a reported-on serving cell and the antenna of each reported-on neighbor cell.

14. The method of claim 1 wherein a first factor in the plurality of factors is based on (a) a measure of statistical dispersion of the set of distances between the antenna of a reported-on serving cell and the antenna of each reported-on neighbor cell relative to (b) a value that is derived by the data-processing system from data that is specific to the wireless network.

15. The method of claim 1 wherein, to generate the estimated first location from among a plurality of candidate pre-defined locations in the wireless network, the probability is applied to each of the pre-defined locations.

16. The method of claim 1 further comprising:
  evaluating, by the data-processing system, another factor that is based on at least a portion of the received data, wherein the other factor is probative of whether the reported-on signals were received by the wireless terminal above-the-clutter;
  generating, by the data-processing system, based on the other factor, an estimated probability that the reported-on signals were received by the wireless terminal above-the-clutter;
  wherein the generating of the estimated first location and the elimination of the second location are further based on the probability that the reported-on signals were received by the wireless terminal above-the-clutter.

17. The method of claim 1 further comprising:
  evaluating, by the data-processing system, another factor that is based on at least a portion of the received data, wherein the other factor is probative of whether the reported-on signals were received by the wireless terminal while at a pre-defined classification of speed;
  generating, by the data-processing system, based on the other factor, an estimated probability that the reported-on signals were received by the wireless terminal while at the pre-defined classification of speed;
  wherein the generating of the estimated first location and the elimination of the second location are further based on the probability that the reported-on signals were received by the wireless terminal while at the pre-defined classification of speed.

18. A method associated with a wireless network, the method comprising:
- receiving, by a data-processing system, reports on wireless signals received by a wireless terminal from a plurality of antennas in the wireless network;
- evaluating, by the data-processing system, a factor that is based on the reports, wherein the factor is probative of whether the reported-on signals were received above-the-clutter by the wireless terminal;
- generating, by the data-processing system, based on the factor, an estimated probability that the reported-on signals were received above-the-clutter by the wireless terminal; and
- generating, based on the probability, an estimated first location for the wireless terminal, thereby eliminating, also based on the probability, a second location for the wireless terminal.

19. The method of claim 18 wherein the factor is based on a measure of the signal strengths of the reported-on signals.

20. The method of claim 18 further comprising:
- evaluating, by the data-processing system, another factor that is based on at least a portion of the received data, wherein the other factor is probative of whether the reported-on signals were received by the wireless terminal while at a pre-defined classification of speed;
- generating, by the data-processing system, based on the other factor, an estimated probability that the reported-on signals were received by the wireless terminal while at the pre-defined classification of speed;
- wherein the generating of the estimated first location and the elimination of the second location are further based on the probability that the reported-on signals were received by the wireless terminal while at the pre-defined classification of speed.

* * * * *